US009445447B2

(12) United States Patent
Pal et al.

(10) Patent No.: US 9,445,447 B2
(45) Date of Patent: Sep. 13, 2016

(54) PAIRING A WIRELESS DEVICES WITHIN A VEHICLE

(71) Applicant: GM Global Technology Operations LLC, Detroit, MI (US)

(72) Inventors: Dipankar Pal, Sylvania, OH (US); David P. Pop, Garden City, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 442 days.

(21) Appl. No.: 13/922,674

(22) Filed: Jun. 20, 2013

(65) Prior Publication Data

US 2014/0378055 A1 Dec. 25, 2014

(51) Int. Cl.
*H04B 7/00* (2006.01)
*H04W 76/02* (2009.01)
*H04W 8/00* (2009.01)

(52) U.S. Cl.
CPC ........... *H04W 76/023* (2013.01); *H04W 8/005* (2013.01)

(58) Field of Classification Search
CPC .......................... H04W 76/023; H04W 8/005

USPC ........................................................ 455/41.2
See application file for complete search history.

(56) References Cited

U.S. PATENT DOCUMENTS

2015/0056919 A1* 2/2015 Fyke ..................... H04W 12/06
455/41.2

* cited by examiner

*Primary Examiner* — Eugene Yun
(74) *Attorney, Agent, or Firm* — Christopher DeVries; Reising Ethington P.C.

(57) ABSTRACT

A system and a method for establishing short range wireless communication between two vehicle modules. The system determines the availability of a first vehicle module and a second vehicle module to establish a short range wireless communication connection. The determination may be based upon whether the first vehicle module is storing pairing data. The system validates the pairing data at the second vehicle module using a wired connection. If the pairing data is validated, the first and second vehicle modules may establish a wireless connection using at least a portion of the pairing data. When the wireless connection ends, the system may re-determine the availability and revalidate any pairing data via the wired connection before establishing a wireless connection.

9 Claims, 8 Drawing Sheets

PAIRING A WIRELESS DEVICES WITHIN A VEHICLE

TECHNICAL FIELD

The present invention relates to short range wireless communication in a vehicle, and more specifically to pairing devices in the vehicle using short range wireless communication.

BACKGROUND

Modern vehicles may include telematics systems that may have the capability of communicating using short range wireless communication such as Bluetooth. In addition, some mobile phones include features and software applications beyond mere telephony such as the ability to utilize short range wireless communication.

SUMMARY

According to an embodiment of the invention, there is provided a method of establishing short range wireless communication (SRWC) between two or more vehicle modules. The method includes the steps of: determining the availability of a first vehicle module and a second vehicle module to establish an SRWC connection based at least in part on whether the first vehicle module is carrying first pairing data; validating the first pairing data at the second vehicle module using a wired connection; and establishing between the first and second vehicle modules a wireless connection using at least one data element of the first pairing data, wherein the wireless connection is SRWC.

In accordance with another aspect of the invention, there is provided a method of short range wireless communication (SRWC) pairing between two or more vehicle modules. The method includes a steps of determining the SRWC pairing status of a first vehicle module via a wired connection between the first vehicle module and a second vehicle module—an available pairing status includes determining first pairing data at the first vehicle module. The method further includes determining the SRWC pairing status of the second vehicle module—and here, an available pairing status includes determining second pairing data at the second vehicle module. The method also includes validating the first and second pairing data at the second vehicle module if the pairing status of both the first and second vehicle modules are available. And the method includes a step of initiating a new pairing procedure using the wired connection when it is determined that: either of the first pairing data or the second pairing data is not available, or the first and second pairing data are available, but the first pairing data cannot be validated at the second vehicle module.

BRIEF DESCRIPTION OF THE DRAWINGS

One or more embodiments of the invention will hereinafter be described in conjunction with the appended drawings, wherein like designations denote like elements, and wherein.

DETAILED DESCRIPTION OF THE ILLUSTRATED EMBODIMENT(S)

The system and method described below pertain to securely sharing or conveying pairing data or information of two vehicle devices to enable short range wireless communication (SRWC, e.g., Bluetooth or Wi-Fi Direct). The two devices may already be coupled via a vehicle local area network (VLAN); therefore, SRWC may provide an additional means of communication. In some systems, the pairing data may be conveyed wirelessly during the pairing process between the two vehicle devices. However, transmitting the pairing data wirelessly may make the pairing process subject to malicious attacks (e.g., such as man in the middle attacks). The following system conveys pairing data via a wired connection and thereafter enables wireless data transfer using SRWC, which in some cases maybe faster than the VLAN. In addition, the following disclosure includes several methods of using the system.

Communications System

Figure 1:
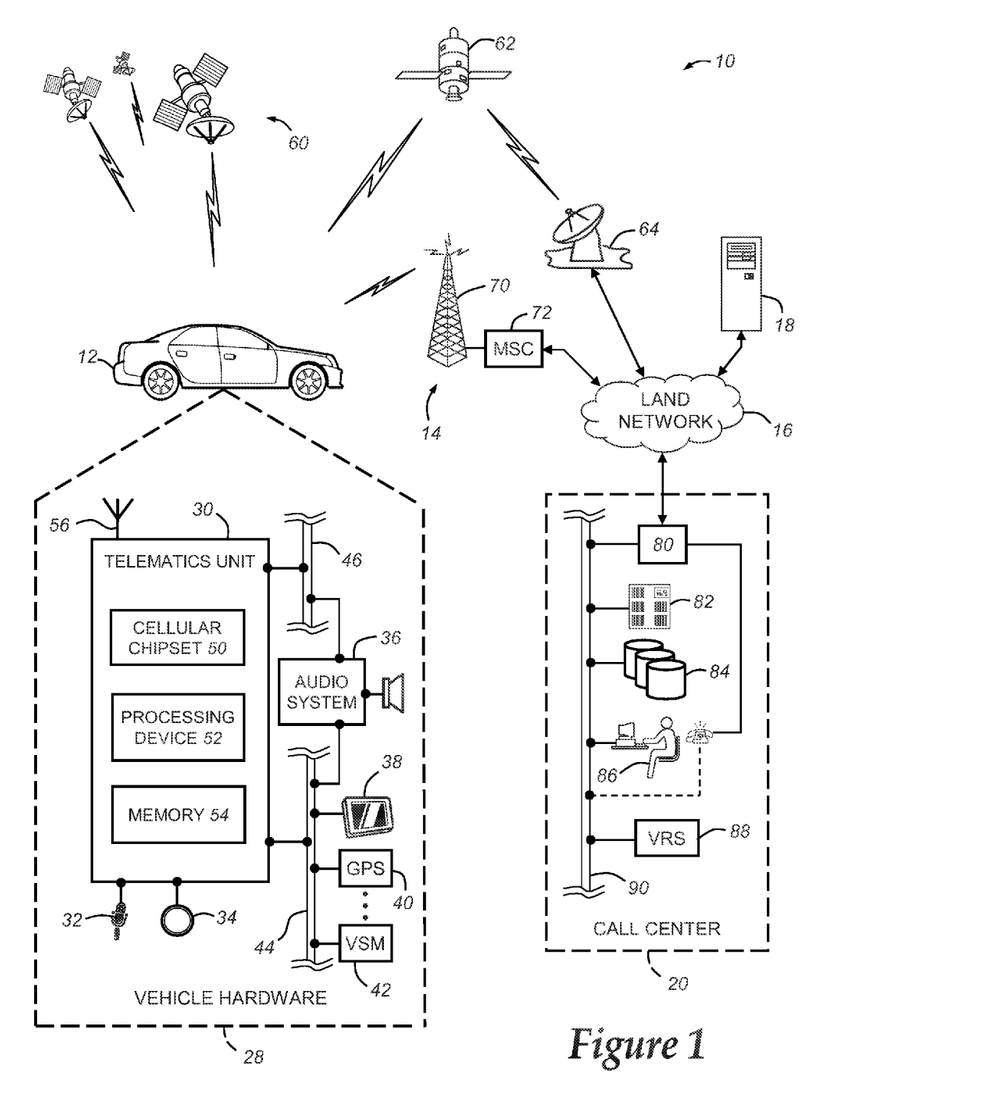
FIG. 1 is a block diagram depicting an embodiment of a communications system that is capable of utilizing the method disclosed herein.

With reference to FIG. 1, there is shown an operating environment that comprises a mobile vehicle communications system 10 and that can be used to implement the method disclosed herein. Communications system 10 generally includes a vehicle 12, one or more wireless carrier systems 14, a land communications network 16, a computer 18, and a call center 20. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such communications system 10; however, other systems not shown here could employ the disclosed method as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 28 is shown generally in FIG. 1 and includes a telematics unit 30, a microphone 32, one or more pushbuttons or other control inputs 34, an audio system 36, a visual display 38, and a GPS module 40 as well as a number of vehicle system modules (VSMs) 42. Some of these devices can be connected directly to the telematics unit such as, for example, the microphone 32 and pushbutton(s) 34, whereas others are indirectly connected using one or more network connections, such as a communications bus 44 or an entertainment bus 46. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few. In addition, any direct and indirect connections may utilize one or more gateway devices 96 protocol conversion between otherwise incompatible devices. For example, in some circumstances, the telematics unit may be coupled to the gateway device 96 via a first bus (e.g., utilizing a proprietary LAN) and the gateway device further may be coupled to a secondary device (e.g., various vehicle electronics 28, a VSM 42, etc.) via a second bus (e.g., utilizing a nonproprietary LAN such as CAN or MOST). The gateway device 96 may enable the telematics unit 30 to communicate to the secondary device regardless of the fact that the telematics unit 30 and VSM 42 are not configured to communicate directly or according to the same protocol or over the same network.

Telematics unit 30 can be an OEM-installed (embedded) or aftermarket device that is installed in the vehicle and that enables wireless voice and/or data communication over wireless carrier system 14 and via wireless networking. This enables the vehicle to communicate with call center 20, other telematics-enabled vehicles, or some other entity or device. The telematics unit preferably uses radio transmissions to establish a communications channel (a voice channel and/or a data channel) with wireless carrier system 14 so that voice and/or data transmissions can be sent and received over the channel. By providing both voice and data communication, telematics unit 30 enables the vehicle to offer a number of different services including those related to navigation, telephony, emergency assistance, diagnostics, infotainment, etc. Data can be sent either via a data connection, such as via packet data transmission over a data channel, or via a voice channel using techniques known in the art. For combined services that involve both voice communication (e.g., with a live advisor or voice response unit at the call center 20) and data communication (e.g., to provide GPS location data or vehicle diagnostic data to the call center 20), the system can utilize a single call over a voice channel and switch as needed between voice and data transmission over the voice channel, and this can be done using techniques known to those skilled in the art.

According to one embodiment, telematics unit 30 utilizes cellular communication according to either GSM or CDMA standards and thus includes a standard cellular chipset 50 for voice communications like hands-free calling, a wireless modem for data transmission, an electronic processing device 52, one or more digital memory devices 54, and a dual antenna 56. It should be appreciated that the modem can either be implemented through software that is stored in the telematics unit and is executed by processor 52, or it can be a separate hardware component located internal or external to telematics unit 30. The modem can operate using any number of different standards or protocols such as EVDO, CDMA, GPRS, and EDGE. Wireless networking between the vehicle and other networked devices can also be carried out using telematics unit 30. For this purpose, telematics unit 30 can be configured to communicate wirelessly according to one or more suitable wireless protocols (e.g., WiMAX, ZigBee®, etc.), including any short range wireless communication (SRWC) such as any suitable Wi-Fi standard (e.g., IEEE 802.11), Wi-Fi Direct, Bluetooth, wireless infrared transmission, or various combinations thereof. And in some implementations, the telematics unit 30 may have an embedded SRWC module 31 configurable to communicate via a particular wireless protocol (e.g., a Bluetooth module); in addition, the module 31 may be coupled to a dedicated antenna 33 (or it may utilize an antenna otherwise coupled to the telematics unit) (e.g., see FIGS. 2A and 2B). When used for packet-switched data communication such as TCP/IP, the telematics unit can be configured with a static IP address or can set up to automatically receive an assigned IP address from another device on the network such as a router or from a network address server.

Processor 52 can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Processor 52 executes various types of digitally-stored instructions, such as software or firmware programs stored in memory 54, which enable the telematics unit to provide a wide variety of services. For instance, processor 52 can execute programs or process data to carry out at least a part of the method discussed herein.

Telematics unit 30 can be used to provide a diverse range of vehicle services that involve wireless communication to and/or from the vehicle. Such services include: turn-by-turn directions and other navigation-related services that are provided in conjunction with the GPS-based vehicle navigation module 40; airbag deployment notification and other emergency or roadside assistance-related services that are provided in connection with one or more collision sensor interface modules such as a body control module (not shown); diagnostic reporting using one or more diagnostic modules; and infotainment-related services where music, webpages, movies, television programs, videogames and/or other information is downloaded by an infotainment module (not shown) and is stored for current or later playback. The above-listed services are by no means an exhaustive list of all of the capabilities of telematics unit 30, but are simply an enumeration of some of the services that the telematics unit is capable of offering. Furthermore, it should be understood that at least some of the aforementioned modules could be implemented in the form of software instructions saved internal or external to telematics unit 30, they could be hardware components located internal or external to telematics unit 30, or they could be integrated and/or shared with each other or with other systems located throughout the vehicle, to cite but a few possibilities. In the event that the modules are implemented as VSMs 42 located external to telematics unit 30, they could utilize vehicle bus 44 to exchange data and commands with the telematics unit.

GPS module 40 receives radio signals from a constellation 60 of GPS satellites. From these signals, the module 40 can determine vehicle position that is used for providing navigation and other position-related services to the vehicle driver. Navigation information can be presented on the display 38 (or other display within the vehicle) or can be presented verbally such as is done when supplying turn-by-turn navigation. The navigation services can be provided using a dedicated in-vehicle navigation module (which can be part of GPS module 40), or some or all navigation services can be done via telematics unit 30, wherein the position information is sent to a remote location for purposes of providing the vehicle with navigation maps, map annotations (points of interest, restaurants, etc.), route calculations, and the like. The position information can be supplied to call center 20 or other remote computer system, such as computer 18, for other purposes, such as fleet management. Also, new or updated map data can be downloaded to the GPS module 40 from the call center 20 via the telematics unit 30.

Apart from the audio system 36 and GPS module 40, the vehicle 12 can include other vehicle system modules (VSMs) 42 in the form of electronic hardware components that are located throughout the vehicle and typically receive input from one or more sensors and use the sensed input to perform diagnostic, monitoring, control, reporting and/or other functions. Each of the VSMs 42 is preferably connected by communications bus 44 to the other VSMs, as well as to the telematics unit 30, and can be programmed to run vehicle system and subsystem diagnostic tests. As examples, one VSM 42 can be an engine control module (ECM) that controls various aspects of engine operation such as fuel ignition and ignition timing, another VSM 42 can be a powertrain control module that regulates operation of one or more components of the vehicle powertrain, and another VSM 42 can be a body control module that governs various electrical components located throughout the vehicle, like the vehicle's power door locks and headlights. According to one embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VSMs are only examples of some of the modules that may be used in vehicle 12, as numerous others are also possible.

Vehicle electronics 28 also includes a number of vehicle user interfaces that provide vehicle occupants with a means of providing and/or receiving information, including microphone 32, pushbuttons(s) 34, audio system 36, and visual display 38. As used herein, the term 'vehicle user interface' broadly includes any suitable form of electronic device, including both hardware and software components, which is located on the vehicle and enables a vehicle user to communicate with or through a component of the vehicle. Microphone 32 provides audio input to the telematics unit to enable the driver or other occupant to provide voice commands and carry out hands-free calling via the wireless carrier system 14. For this purpose, it can be connected to an on-board automated voice processing unit utilizing human-machine interface (HMI) technology known in the art. The pushbutton(s) 34 allow manual user input into the telematics unit 30 to initiate wireless telephone calls and provide other data, response, or control input. Separate pushbuttons can be used for initiating emergency calls versus regular service assistance calls to the call center 20. Audio system 36 provides audio output to a vehicle occupant and can be a dedicated, stand-alone system or part of the primary vehicle audio system. According to the particular embodiment shown here, audio system 36 is operatively coupled to both vehicle bus 44 and entertainment bus 46 and can provide AM, FM and satellite radio, CD, DVD and other multimedia functionality. This functionality can be provided in conjunction with or independent of the infotainment module described above. Visual display 38 is preferably a graphics display, such as a touch screen on the instrument panel or a heads-up display reflected off of the windshield, and can be used to provide a multitude of input and output functions. Various other vehicle user interfaces can also be utilized, as the interfaces of FIG. 1 are only an example of one particular implementation.

The vehicle electronics 28 may also include a multitainment device or a human machine interface (HMI) device 100 which may include some of the vehicle electronics previously discussed (e.g., the audio system 36, the visual display 38, etc.) (e.g., see FIGS. 2A and 2B). As used herein, the HMI device 100 may include all suitable electronics, software, etc. for providing vehicle entertainment and vehicle infotainment services to the vehicle users and/or occupants. The device 100 may be modular or may be embedded within the vehicle 12. In addition, the HMI device 100 may be integrated (e.g., a fixture) within the vehicle or in some circumstances may be detachably fixed or detachably tethered. Where the device 100 is detachable, the device may be operable both inside and outside of the vehicle. Furthermore, the device 100 may have an antenna 103 coupled to a SRWC module 101 therein (e.g., a Bluetooth module). Examples of HMI devices include interactive displays in the vehicle dashboard, interactive displays embedded within the backing of vehicle seating or the vehicle headliner, and other interactive vehicle devices/displays that are portable.

Wireless carrier system 14 is preferably a cellular telephone system that includes a plurality of cell towers 70 (only one shown), one or more mobile switching centers (MSCs) 72, as well as any other networking components required to connect wireless carrier system 14 with land network 16. Each cell tower 70 includes sending and receiving antennas and a base station, with the base stations from different cell towers being connected to the MSC 72 either directly or via intermediary equipment such as a base station controller. Cellular system 14 can implement any suitable communications technology, including for example, analog technologies such as AMPS, or the newer digital technologies such as CDMA (e.g., CDMA2000) or GSM/GPRS. As will be appreciated by those skilled in the art, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 14, a different wireless carrier system in the form of satellite communication can be used to provide uni-directional or bi-directional communication with the vehicle. This can be done using one or more communication satellites 62 and an uplink transmitting station 64. Uni-directional communication can be, for example, satellite radio services, wherein programming content (news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and station 64. If used, this satellite telephony can be utilized either in addition to or in lieu of wireless carrier system 14.

Land network 16 may be a conventional land-based telecommunications network that is connected to one or more landline telephones and connects wireless carrier system 14 to call center 20. For example, land network 16 may include a public switched telephone network (PSTN) such as that used to provide hardwired telephony, packet-switched data communications, and the Internet infrastructure. One or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, call center 20 need not be connected via land network 16, but could include wireless telephony equipment so that it can communicate directly with a wireless network, such as wireless carrier system 14.

Computer 18 can be one of a number of computers accessible via a private or public network such as the Internet. Each such computer 18 can be used for one or more purposes, such as a web server accessible by the vehicle via telematics unit 30 and wireless carrier 14. Other such accessible computers 18 can be, for example: a service center computer where diagnostic information and other vehicle data can be uploaded from the vehicle via the telematics unit 30; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 12 or call center 20, or both. A computer 18 can also be used for providing Internet connectivity such as DNS services or as a network address server that uses DHCP or other suitable protocol to assign an IP address to the vehicle 12.

Call center 20 is designed to provide the vehicle electronics 28 with a number of different system back-end functions and, according to the exemplary embodiment shown here, generally includes one or more switches 80, servers 82, databases 84, live advisors 86, as well as an automated voice response system (VRS) 88, all of which are known in the art. These various call center components are preferably coupled to one another via a wired or wireless local area network 90. Switch 80, which can be a private branch exchange (PBX) switch, routes incoming signals so that voice transmissions are usually sent to either the live adviser 86 by regular phone or to the automated voice response system 88 using VoIP. The live advisor phone can also use VoIP as indicated by the broken line in FIG. 1. VoIP and other data communication through the switch 80 is implemented via a modem (not shown) connected between the switch 80 and network 90. Data transmissions are passed via the modem to server 82 and/or database 84. Database 84 can store account information such as subscriber authentication information, vehicle identifiers, profile records, behavioral patterns, and other pertinent subscriber information. Data transmissions may also be conducted by wireless systems, such as 802.11x, GPRS, and the like. Although the illustrated embodiment has been described as it would be used in conjunction with a manned call center 20 using live advisor 86, it will be appreciated that the call center can instead utilize VRS 88 as an automated advisor or, a combination of VRS 88 and the live advisor 86 can be used.

Method

Figure 2A:
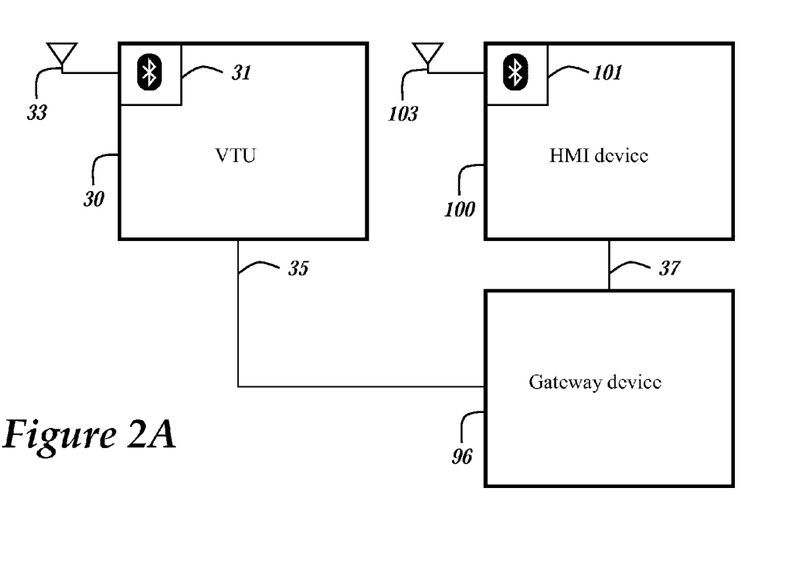
FIG. 2A illustrates one configuration of a vehicle system.
Figure 2B:
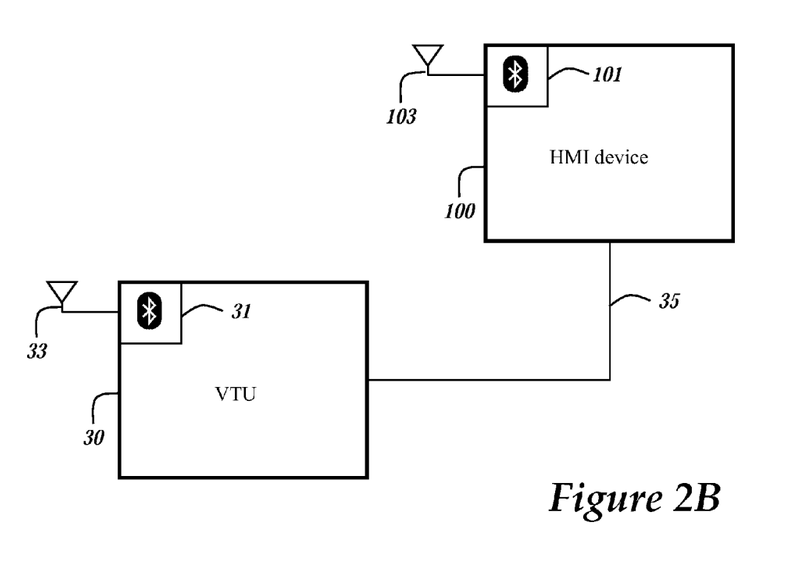
FIG. 2B illustrates another configuration of a vehicle system.

Turning now to FIGS. 2A and 2B, there are shown two configurations of a vehicle telematics unit 30 and a HMI device 100. In FIG. 2A, there is shown the telematics unit 30, the HMI device 100, and the gateway device 96. The telematics unit 30 having a Bluetooth module 31 and a Bluetooth antenna 33 is shown coupled to the gateway device 96 via a proprietary local area network (PLAN) 35. In addition, the HMI device 100 having a Bluetooth module 101 and a Bluetooth antenna 103 is shown coupled to the gateway device 96 via a nonproprietary local area network (NLAN) 37. In FIG. 2B, the telematics unit 30 and the HMI device 100 are shown coupled directly via the PLAN 35; i.e., the gateway device 96 and NLAN 37 are absent. The networking protocol(s), interfaces, and hardware/software designs for the devices of FIGS. 2A and 2B will be apparent to those having ordinary skill in the art.

Figure 3:
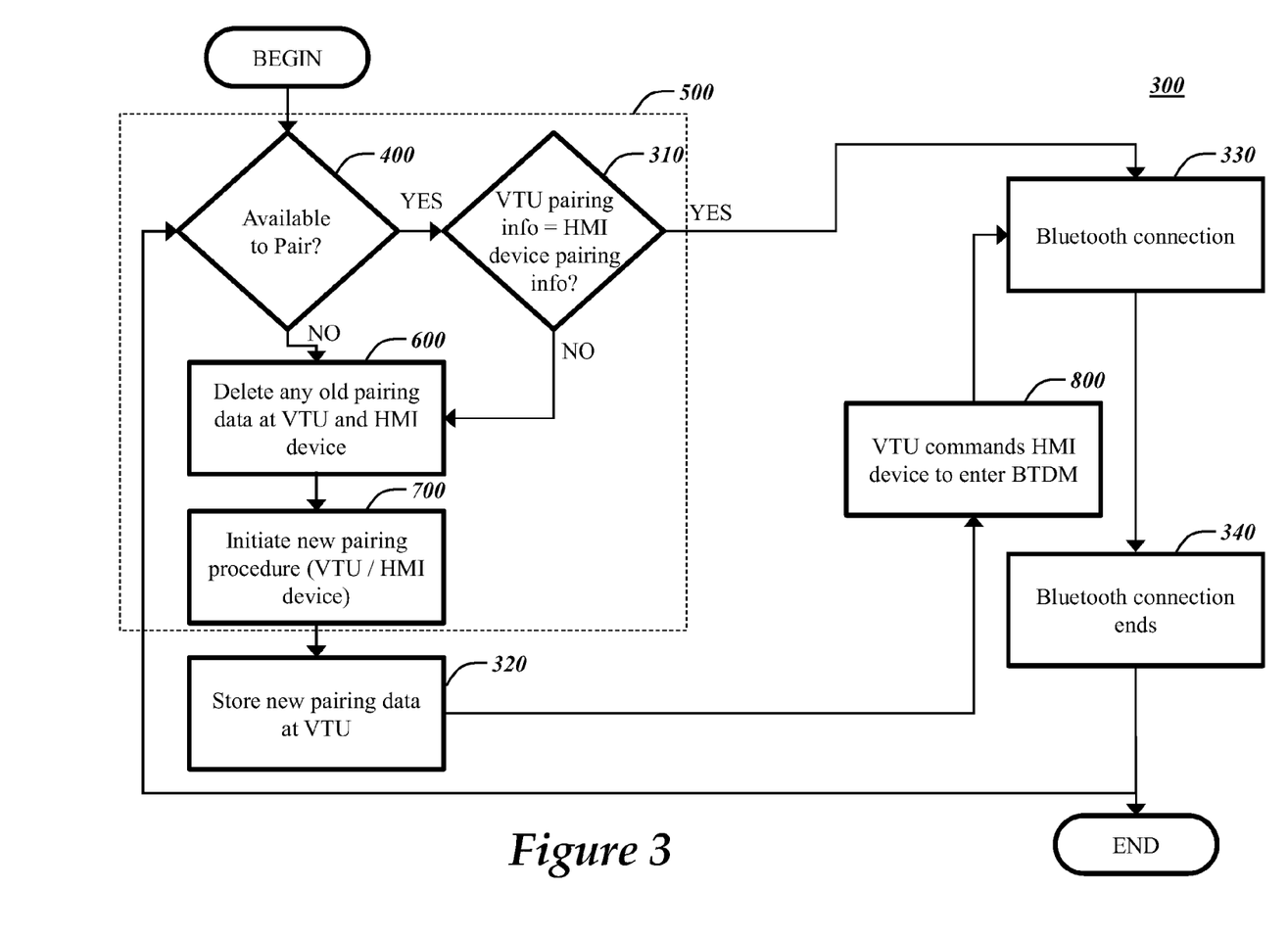
FIG. 3 illustrates a flowchart of one exemplary embodiment of a method of securely communicating between two vehicle modules.

Turning now to FIG. 3, there is shown a flowchart illustrating an exemplary embodiment of a method 300 of securely communicating between a first vehicle module (e.g., the vehicle telematics unit or VTU 30) and a second vehicle module (e.g., the HMI device 100). While the following disclosure discusses the telematics unit and the HMI device, it should be appreciated that the first and second vehicle modules may include other devices or units within the vehicle. Furthermore, in some embodiments, there may be third, fourth, etc. vehicle modules which act as slaves to the first vehicle module 30.

The method 300 begins within an availability assessment routine 500 that includes steps 310, 400, 600, and 700. As will be explained in greater detail below, the routine 500 pertains to determining the availability of the HMI device and the VTU for pairing and additional system steps which depend upon that availability. For example, step 400 determines whether the VTU 30 and the HMI device 100 are available for pairing. If either the VTU or the HMI device is unavailable, the method proceeds to step 600 deleting pairing information or data stored at the VTU and/or the HMI device. For example, this pairing data may have been previously stored according to a previous pairing. More specifically, if the VTU has pairing data and the HMI device does not, this may indicate that the HMI device has been replaced in the vehicle. Or if the HMI device has pairing data and the VTU does not, this may indicate that the VTU has been replaced in the vehicle. After any old pairing data has been deleted, the method may proceed to step 700 wherein a new pairing procedure may be initiated between the VTU and the HMI device. Steps 400, 600, and 700 will also be explained in greater detail below.

When it is determined at step 400 that the HMI device and the VTU are available for pairing, the method may proceed to step 310. At step 310, the pairing data stored at the VTU and the pairing data stored at the HMI device may be compared; more specifically, pairing data may include one or more data elements or device identifiers which may include a Bluetooth address (BD_Addr) and a Bluetooth key or code. At step 310, at least one data element of the pairing data in the VTU (e.g., a previously provided Bluetooth address) may be compared to at least one data element of the pairing data provided by the HMI device (e.g., its Bluetooth address). In this example, if the Bluetooth addresses do not match or not otherwise identical or equal, the method may proceed to steps 600 and 700. But if at step 310 it is determined that the Bluetooth addresses match, the method may proceed to step 330 (e.g., a Bluetooth connection), as will be explained in greater detail below.

Figure 5:
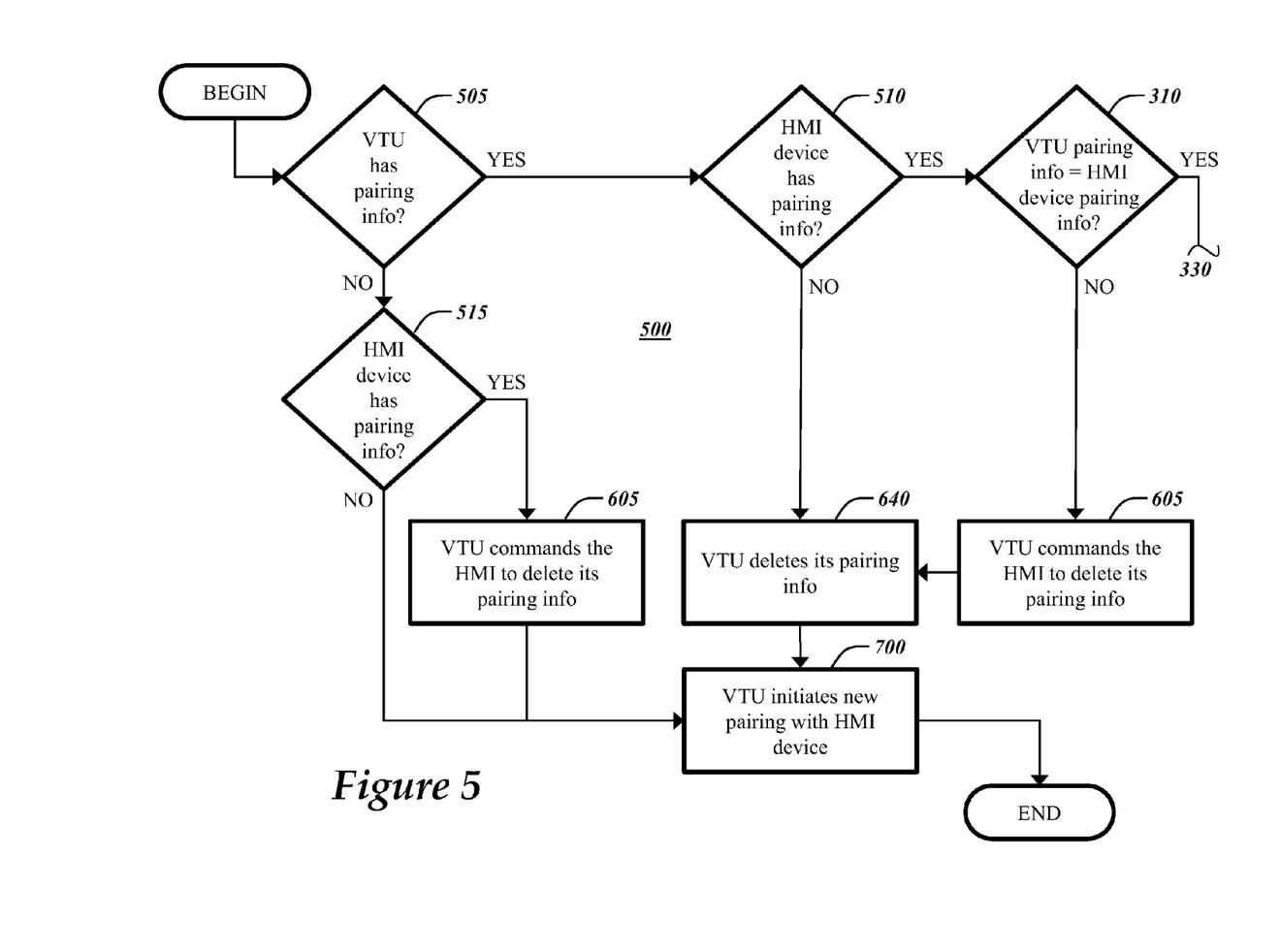
FIG. 5 illustrates a portion of the flowchart of FIG. 3 in greater detail.

The availability assessment routine 500 of the VTU and the HMI device to pair is illustrated in greater detail in the flowchart of FIG. 5. The method begins at step 505 where it is determined whether the VTU 30 has pairing data stored therein. If the VTU does not have stored pairing data, the method proceeds to step 515 and determines whether the HMI device 100 has any stored pairing data. If the HMI device does not have any stored pairing data, the flowchart proceeds to step 700 to initiate a new pairing procedure. If at step 515, the HMI device does have stored pairing data, the VTU commands the HMI device to delete its pairing data at step 605 (see also FIG. 6, 605, 620) and proceeds thereafter to step 700 (initiating a new pairing procedure). If at step 505 it is determined that the VTU does have stored pairing data, the method proceeds to step 510 to determine whether the HMI device has stored pairing data as well.

However, if no pairing data is stored at the HMI device, the method proceeds to step 640 where the VTU deletes its pairing data and the method proceeds thereafter to step 700 (initiating a new pairing procedure).

If at step 510 the HMI device does have stored or determined pairing data (and the VTU has stored pairing data, as determined at step 505), the method proceeds to step 310. As discussed above, step 310 compares at least a portion of the pairing data of the VTU and the pairing data of the HMI device and determines whether they are identical or meet a pre-established requisite relationship. If the pairing data (or at least one element) does not match, the method proceeds to step 605 where the VTU commands the HMI device to delete its pairing data. Afterwards the method proceeds to step 640 where the VTU deletes its pairing data, and thereafter the method proceeds to step 700 (initiating a new pairing procedure). FIG. 5 also illustrates that if the pairing data (or at least one element) of the VTU and the HMI device does match at step 310, the method proceeds to step 330 (shown in FIG. 3 and discussed below).

Figure 4:
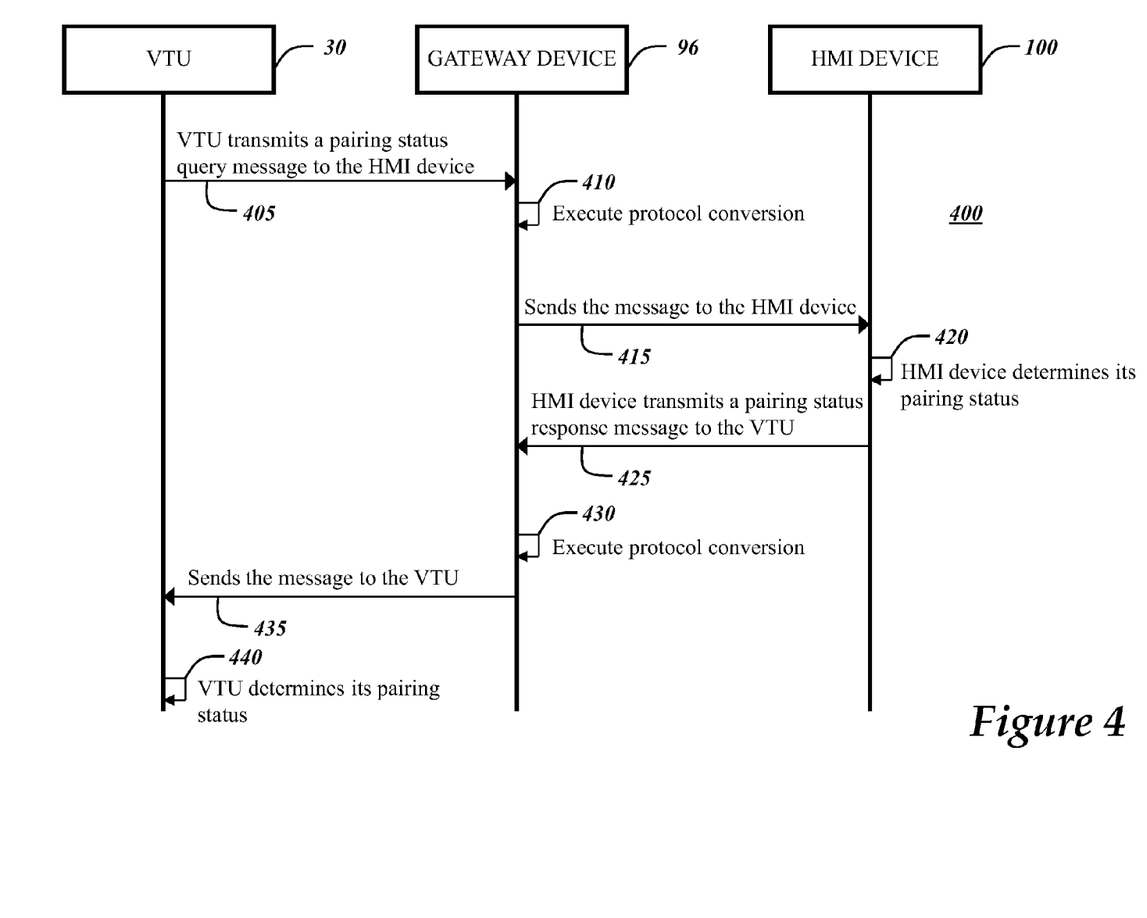
FIG. 4 illustrates a portion of the flowchart of FIG. 3 in greater detail.

Returning to FIG. 3, one example of the messaging associated with step 400 that may implemented over the PLAN and/or the NLAN (of FIG. 2A) is shown in FIG. 4. FIG. 4 illustrates the VTU 30, the gateway device 96, and HMI device 100 and one exemplary messaging procedure for implementing the step 400. For example, at step 405 the VTU transmits a query message to the HMI device to determine its pairing availability or pairing status (PS); i.e., whether it has any pairing data stored therein. The message is received at the gateway device 96 and at step 410 a protocol conversion is executed (e.g., to convert the message for compatibility between the PLAN protocol and the NLAN protocol). The message is then sent (or resent) to the HMI device from the gateway device 96 at step 415. At step 420, the HMI device determines its availability or its pairing status (i.e., the HMI device is unavailable if no pairing data exists or is stored therein; and the device 100 is available if pairing data exists or is stored therein). The HMI device then transmits a response message to the VTU regarding its availability at step 425. The message is received at the gateway device 96 and at step 430 a protocol conversion is executed (e.g., to convert the message for compatibility between the PLAN protocol and the NLAN protocol). The message is then sent (or resent) to the VTU from the gateway device at step 435. FIG. 4 also illustrates in step 440 that the VTU may determine its own pairing status; i.e., whether any pairing data is stored or received therein from the device with which to be paired—e.g., the HMI device 100.

In FIG. 4 (and also FIGS. 6, 7, 8), the telematics unit 30, the gateway device 96, and the HMI device 100 are illustrated; however, it will be appreciated that the system configuration shown in FIG. 2B may also be used in these messaging scenarios. Where the configuration of FIG. 2B is used, no gateway device 96 is present and no protocol conversion is needed; messages transmitted from the VTU 30 to the HMI device 100 are transmitted according to a single protocol (e.g., PLAN), and conversely messages transmitted from the HMI device to the VTU are transmitted in the opposite direction according to the same protocol.

Figure 6:
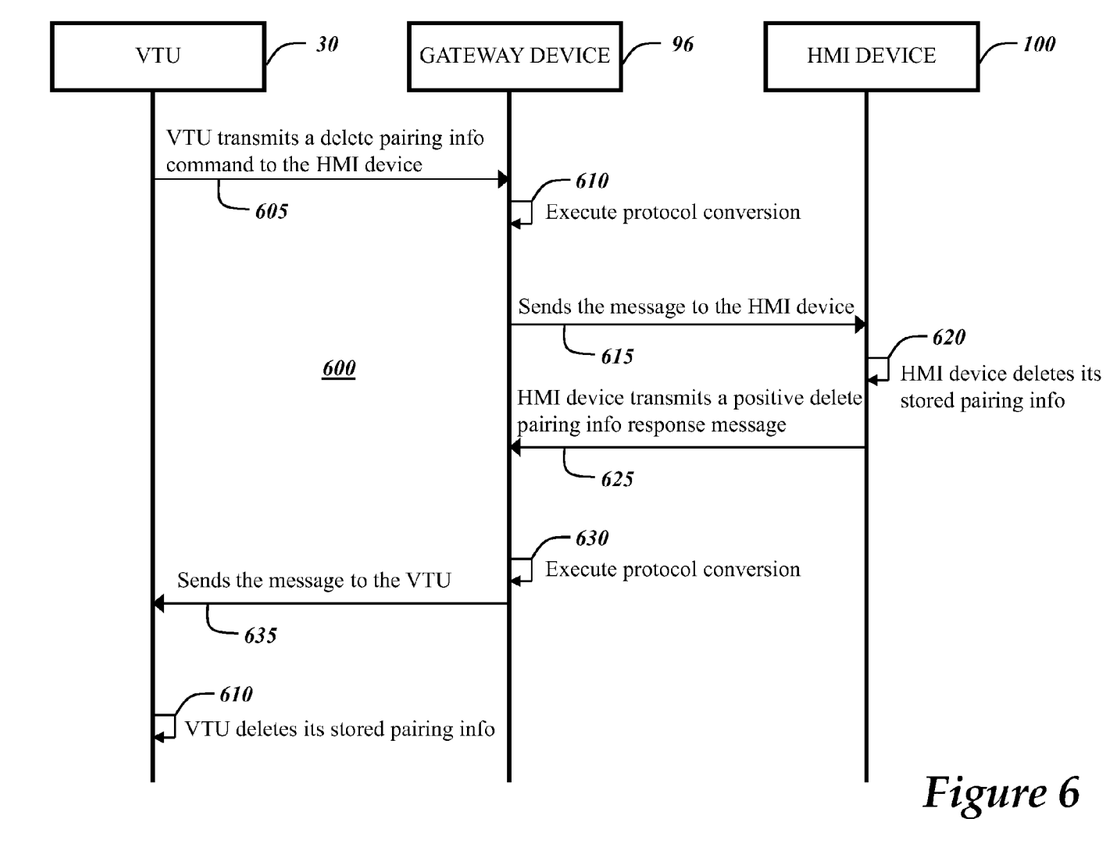
FIG. 6 illustrates a portion of the flowchart of FIG. 3 in greater detail.

Returning to FIG. 3, one example of the messaging associated with step 600 is shown in FIG. 6—the messaging procedure for deleting any old pairing data at the HMI device and/or the VTU. FIG. 6 illustrates at step 605 that the VTU may transmit a command to the HMI device to delete its pairing data or information. At step 610, the gateway device 96 may execute a protocol conversion and send the converted message to the HMI device at step 615. At step 620, the HMI device may delete its stored pairing data, and at step 625, the HMI device may transmit a response message indicating that its pairing message has been deleted (e.g., a positive acknowledgement). This message may be received by the gateway device at step 630, and the gateway device 96 may execute a protocol conversion again. The gateway device at step 635 may send the message to the VTU. As previously discussed with respect to FIG. 5, if the VTU has stored pairing data, it may delete the stored pairing data at step 640. And it should be appreciated that there may be instances where the VTU may execute step 640 without executing steps 605-635.

Figure 7:
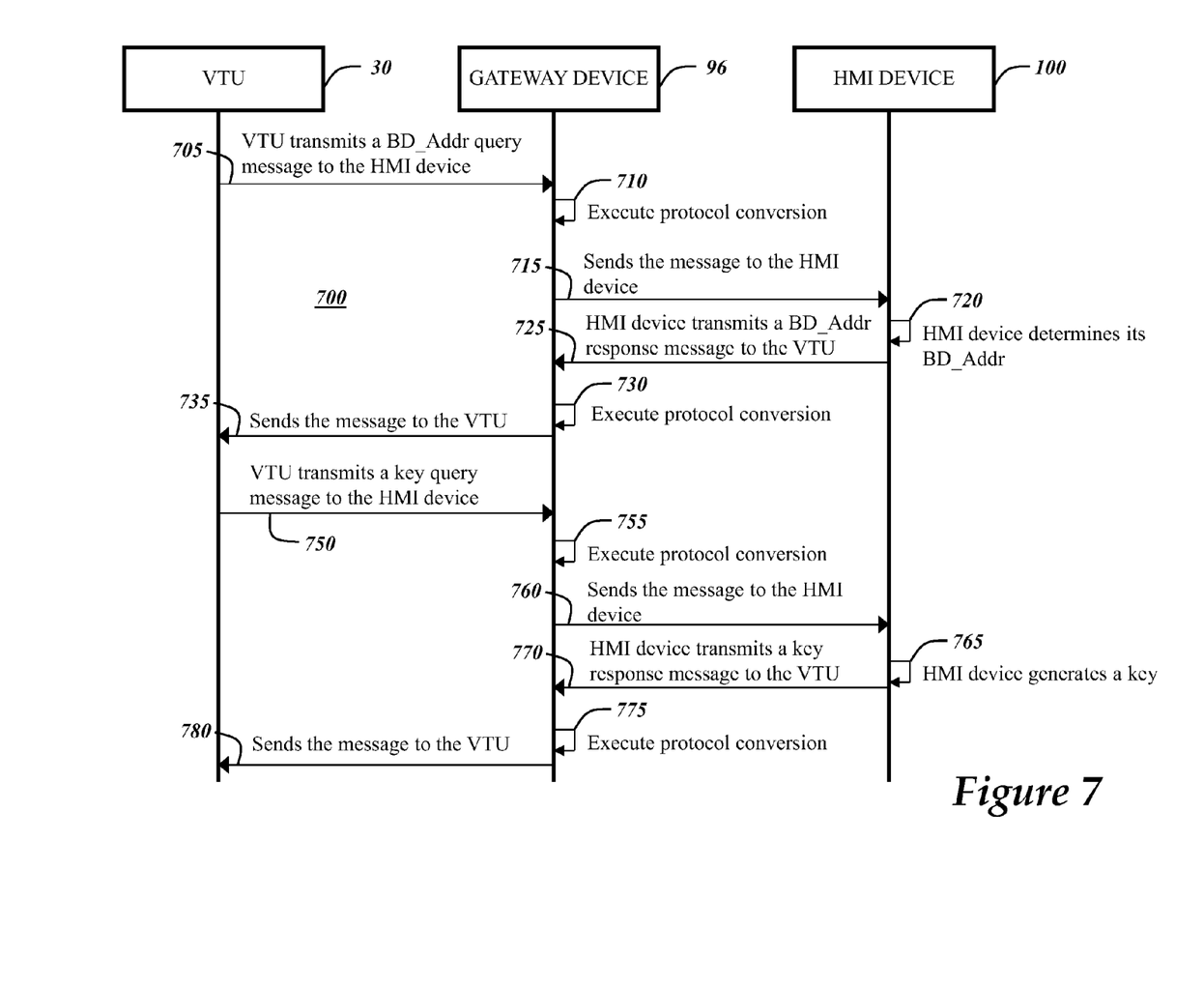
FIG. 7 illustrates a portion of the flowchart of FIG. 3 in greater detail.

Returning to FIG. 3, one example the messaging associated with step 700 is shown in FIG. 7—the procedure for initiating a new pairing procedure between the VTU and HMI device. The messaging procedure begins at step 705 where the VTU transmits a query message to the HMI device to determine at least a portion of its pairing data, e.g., its Bluetooth device address (BD_Addr). At step 710, the gateway device 96 executes the protocol conversion and at step 715, the gateway device sends the message to the HMI device. At step 720, the HMI device determines or identifies its BD_Addr. At step 725, HMI device transmits a response message to the VTU containing its BD_Addr, and after the gateway device receives the message, at step 730, the device 96 executes a protocol conversion. At step 735, the gateway device 96 sends the message to the VTU.

The pairing procedure may also include determining other pairing data, e.g., a key or a code of the HMI device. In FIG. 7 at step 750, the VTU transmits another query message to the HMI device to determine the key. At step 755, the gateway device executes a protocol conversion, and at step 760 sends the message to the HMI device 100. At step 765, HMI device determines or generates a key. The key may or may not be based on or associated with the Bluetooth device address. At step 770, the HMI device transmits a response message to the VTU containing the key. At step 775, the gateway device executes a protocol conversion, and at step 780, the gateway device sends the message to the VTU.

Returning to FIG. 3, step 320 follows step 700, and in step 320, the pairing data received by the VTU may be stored in the memory of the VTU (e.g., memory devices 54). More specifically, the pairing data may include at least the identified BD_Addr and the generated key. Some or all of the pairing data may be utilized to establish a Bluetooth connection; therefore, it is desirable that the VTU and HMI device have the same information and are thus 'paired.'

Figure 8:
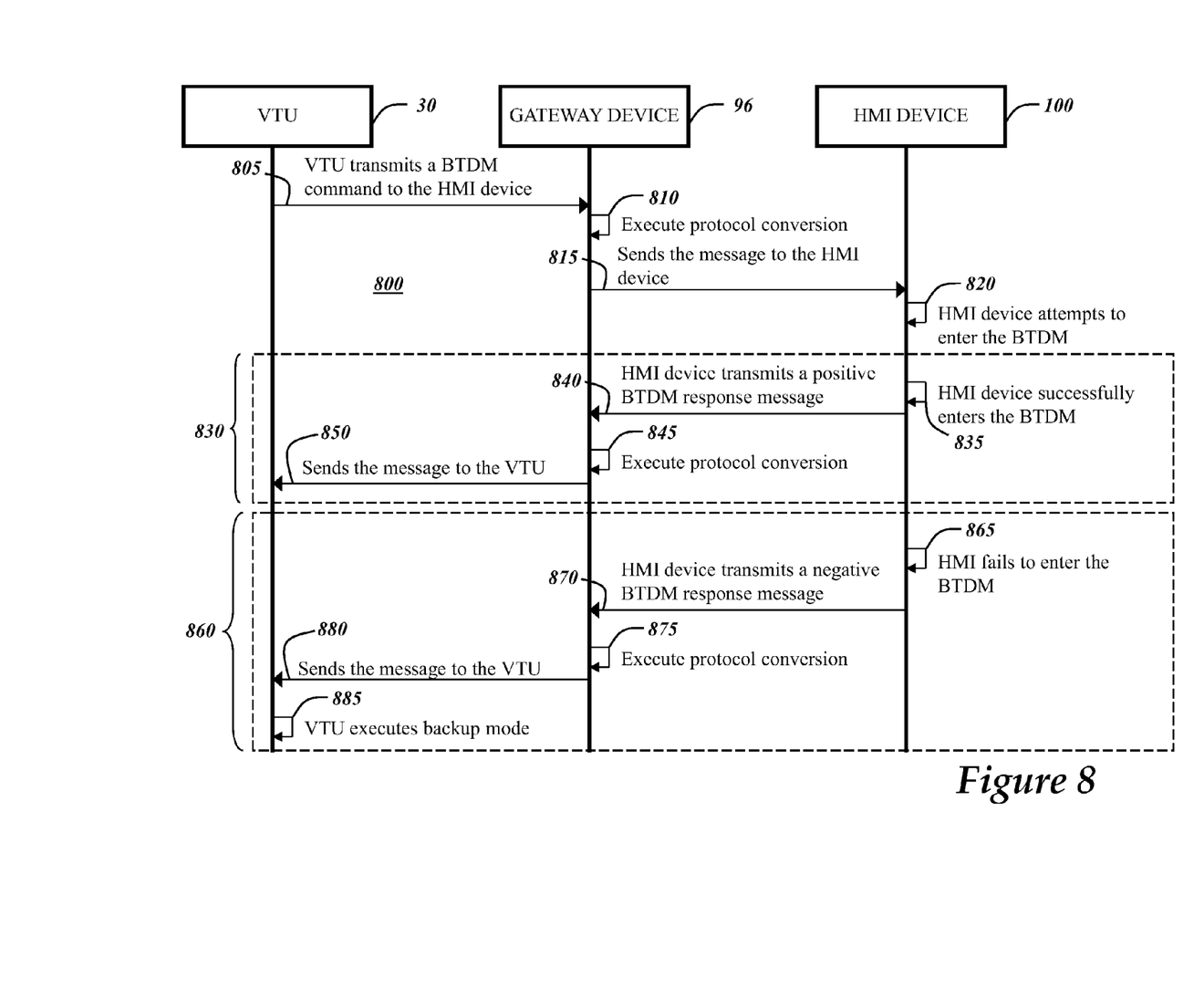
FIG. 8 illustrates a portion of the flowchart of FIG. 3 in greater detail.

FIG. 3 also illustrates that step 800 follows step 320. One example of the messaging procedure associated with step 800 is shown in FIG. 8—illustrating a procedure where the VTU commands the HMI device to enter a Bluetooth discoverable mode (BTDM). The BTDM procedure begins at step 805 where the VTU transmits a command to the HMI device to enter a discoverable mode. The message is received at the gateway device 96 and a protocol conversion is executed at step 810. The gateway device 96 then sends the message to the HMI device at step 815. At step 820, the HMI device attempts to enter the discoverable mode. If the HMI device successfully enters the discoverable mode, the procedure proceeds to messaging sequence 830, and if the HMI device is unsuccessful entering the discoverable mode, the procedure proceeds to messaging sequence 860.

Within messaging sequence 830, the HMI device successfully enters the discoverable mode at step 835, and the HMI device transmits a response message indicating the success at step 840 (e.g., a positive acknowledgement). The message is received at the gateway device 96 and the protocol conversion is executed at step 845. At step 850, the device 96 sends the message to the VTU.

Within messaging sequence 860, the HMI device fails to successfully enter the discoverable mode at step 865, and the HMI device transmits a response message indicating the failure at step 870 (e.g., a negative acknowledgement). The message is received at the gateway device 96, and the device 96 executes a protocol conversion at step 875. At step 880, the device 96 sends the message to the VTU. At step 885, the VTU executes a backup mode in response to the failure. The backup mode may include retransmitting the BTDM command to the HMI device 100 (e.g., repeating steps 805-820). Also, it may include a predetermined number of retransmission attempts. It may also include retransmitting the BTDM command after a predetermined amount of time if no response message (e.g., at steps 850 or 880) is received. Furthermore, the backup mode may include the VTU 30 sending diagnostic messages to the call center 20 to report the failure(s).

Returning to FIG. 3, after the HMI device 100 successfully enters the discoverable mode, the VTU 30 may wait or stand-by for the device 100 to initiate step 330. After the HMI device initiates, a Bluetooth (or other SRWC) connection may be established at step 330—i.e., an over-the-air connection may be made. Step 330 is reached in one of two ways: (1) once the HMI device is in the discoverable mode, the method 300 may proceed from step 800 to step 330 where the Bluetooth connection is established; or (2) once at least one data element of the pairing data received from the HMI device matches that stored at the VTU (step 310), the method 300 may proceed from step 310 to step 330. Step 330 may include various conventional techniques performed wirelessly by Bluetooth devices, as will be known to skilled artisans. These techniques may include matching the key generated by the HMI device 100 with a previously received and stored key at the VTU 30. During the Bluetooth connection at step 330, data and/or data messages may be transmitted and received between the two vehicle modules. This data may include entertainment and/or infotainment service data.

FIG. 3 also contemplates that at some point in time, the Bluetooth connection at step 330 may end. Thus, at step 340, the connection ends. This may occur for a variety of reasons; e.g., a lost connection, purposeful termination of the connection, vehicle electric system actuated OFF (e.g., when the vehicle engine is turned OFF), vehicle or vehicle component repair and/or replacement, etc. The method hereafter ends or proceeds again to step 400. Thus, following a disconnection, the present method may redetermine availability at routine or step 500 (more specifically, at steps 400 and 310) prior to a future Bluetooth connection 330. This revalidation thus permits the VTU 30 to revalidate that the pairing data stored in its memory still matches the pairing data of the HMI device. Thus, the revalidation may occur each ignition cycle of the vehicle.

The described method further enables a secure path for communicating pairing data or information. Pairing data such as the Bluetooth device address and key of the HMI device 100 may be conveyed by wire to the VTU 30 and thereafter, the wireless connection may be executed between the two devices. Since the pairing data is not conveyed wirelessly, it is less susceptible to hacking attacks. Additionally, the described method enables the entertainment and infotainment services to be conveyed to the HMI device 100 by SRWC. These services may demand substantial communicative throughput. Therefore, it is contemplated that once the SRWC connection at step 330 is established, data may be transmitted between the VTU and the HMI device, leaving other existing wired couplings (e.g., data buses 44, 46) free to carry out routine vehicle communications. Thus, the entertainment and infotainment services may be transmitted wirelessly to the VTU 30 which in turn may transmit these services to the HMI device 100. Therefore through the VTU 30, the HMI device may access various remote servers (including the cloud), the call center 20, etc.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method of establishing short range wireless communication (SRWC) between two or more vehicle modules, comprising the steps of:
   determining the availability of a first vehicle module and a second vehicle module to establish an SRWC connection based at least in part on whether the first vehicle module is carrying first pairing data;
   validating the first pairing data at the second vehicle module using a wired connection; and
   establishing between the first and second vehicle modules a wireless connection using at least one data element of the first pairing data, wherein the wireless connection is SRWC.

2. The method of claim 1 wherein the SRWC is Bluetooth or Wi-Fi Direct.

3. The method of claim 1 wherein the first vehicle module is a multi-tainment device and the second vehicle module is a telematics unit.

4. The method of claim 1 wherein the first pairing data includes at least one first data element, wherein the second vehicle module is determined to be available when the second vehicle module has second stored pairing data that includes at least one second data element.

5. The method of claim 4 wherein the validating step includes determining that the at least one first data element is the same as the at least one second data element.

6. The method of claim 5 wherein the at least first one data element includes a first Bluetooth address and a first key, wherein the at least second one data element includes a second Bluetooth address and a second key, wherein the validating step includes determining whether the first Bluetooth address is the same as the second Bluetooth address.

7. The method of claim 6 wherein the establishing step further includes determining whether the first key is the same as the second key.

8. The method of claim 1 wherein a gateway device enables conversion of a message protocol of a first vehicle local area network (VLAN) to a second VLAN, wherein the first VLAN couples the first vehicle module and the gateway device and the second VLAN couples the second vehicle module and the gateway device.

9. The method of claim 1 further comprising transmitting data between the first and second vehicle modules using the established SRWC.

* * * * *